United States Patent
Dreyer et al.

(10) Patent No.: US 12,131,039 B1
(45) Date of Patent: Oct. 29, 2024

(54) SYSTEMS AND METHODS FOR UTILIZING MULTI-FACTOR FEEDBACK CONTROL TO ALLOCATE MEMORY RESOURCES

(71) Applicant: SK Hynix NAND Product Solutions Corp., Rancho Cordova, CA (US)

(72) Inventors: David Dreyer, Oronoco, MN (US); Henry Chu, Rancho Cordova, CA (US); Joey Rodgers, Newcastle, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 40 days.

(21) Appl. No.: 18/131,286

(22) Filed: Apr. 5, 2023

(51) Int. Cl.
*G06F 3/06* (2006.01)

(52) U.S. Cl.
CPC ............ *G06F 3/0631* (2013.01); *G06F 3/061* (2013.01); *G06F 3/0679* (2013.01)

(58) Field of Classification Search
CPC ..... G06F 3/0679; G06F 3/061; G06F 3/06031
See application file for complete search history.

(56) References Cited

U.S. PATENT DOCUMENTS

| | | |
|---|---|---|
| 2014/0101379 A1 | 4/2014 | Tomlin |
| 2016/0210060 A1* | 7/2016 | Dreyer ................ G06F 3/0659 |
| 2017/0083253 A1 | 3/2017 | Kowles |
| 2017/0242592 A1 | 8/2017 | Camp et al. |
| 2021/0216239 A1* | 7/2021 | Dutta .................... G06F 3/0604 |

FOREIGN PATENT DOCUMENTS

KR 10-2022-0048569 4/2022

\* cited by examiner

*Primary Examiner* — Jane W Benner
(74) *Attorney, Agent, or Firm* — HALEY GUILIANO LLP

(57) ABSTRACT

A method includes determining a write amplification factor for a particular NAND-based memory device and a host coupled to the NAND-based memory device and includes calculating a bandwidth of the host. Based on the write amplification factor and the bandwidth of the host, a resource of the NAND-based memory device is allocated between the host and a garbage collection process of the NAND-based memory device.

27 Claims, 9 Drawing Sheets

US 12,131,039 B1

SYSTEMS AND METHODS FOR UTILIZING MULTI-FACTOR FEEDBACK CONTROL TO ALLOCATE MEMORY RESOURCES

INTRODUCTION

The present disclosure is directed to utilizing multi-factor feedback control to allocate memory resources, and more particularly, the present disclosure is directed to allocating memory resources between a host and internal garbage collection operations in certain classes of memory devices.

SUMMARY

In some embodiments, a method comprises determining, using processing circuitry, a write amplification factor for a particular NAND-based memory device and a host coupled to the NAND-based memory device, calculating a bandwidth of the host using the processing circuitry, and causing, using the processing circuitry, a resource of the NAND-based memory device to be allocated based on the write amplification factor and on the bandwidth of the host.

In some embodiments, the NAND-based memory device is a solid state drive, and in some embodiments, the resource is at least one of a buffer, a CPU, or a die. In some embodiments, calculating the bandwidth of the host comprises calculating a number of write operations sent by the host to the NAND-based memory device over a time period. Calculating the bandwidth of the host may further comprise calculating a moving average of the number of write operations.

In some embodiments, a score may be calculated based on the write amplification factor and on the bandwidth of the host, and the resource may be allocated based on the score. The resource may be further allocated based on an amount of unused space of the NAND-based memory device. For example, decreasing the amount of unused space causes more of the resource to be allocated to an internal garbage collection process of the NAND-based memory device.

In some embodiments, a system comprises a host, a NAND-based memory device, and processing circuitry. The processing circuitry determines a write amplification factor for the NAND-based memory device and the host coupled to the NAND-based memory device, calculates a bandwidth of the host, and causes a resource of the NAND-based memory device to be allocated based on the write amplification factor and on the bandwidth of the host.

In some embodiments, a non-transitory computer readable medium stores program code that, when executed, performs a method comprising determining a write amplification factor for a particular NAND-based memory device and a host coupled to the NAND-based memory device, calculating a bandwidth of the host, and causing a resource of the NAND-based memory device to be allocated based on the write amplification factor and on the bandwidth of the host.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
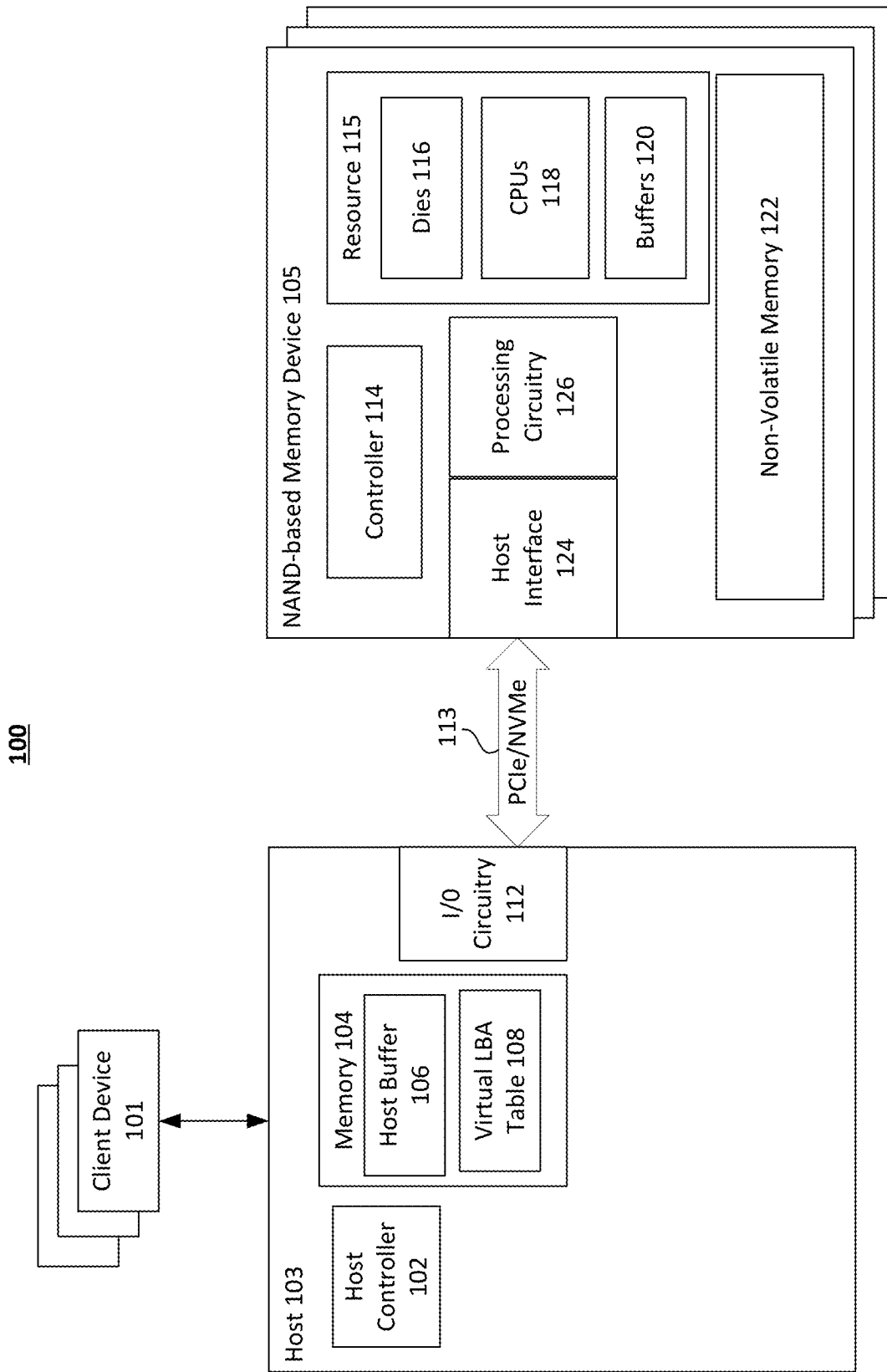
FIG. 1 shows an illustrative diagram of a system that includes a host device and NAND-based memory device that functions as a storage device for the host device, in accordance with some embodiments of the present disclosure.

In certain classes of memory devices, the bandwidth of the host may sometimes be mismatched with the bandwidth of the memory device, resulting in a high variance of performance (e.g., measured by the input/output operations per second between the host and the memory device). If the bandwidth of the memory device is too high, performance may be negatively impacted. If the bandwidth of the host is too high, a capacity of the memory device may be exceeded, resulting in potential physical damage to the memory device. For example, quad level cell (QLC) flash memory devices are able to store more data per cell than triple level cell (TLC) flash memory devices, but have higher variance in performance due to differences in physical properties causing mismatched bandwidths in certain cells. Provided herein are systems and methods for using feedback control to allocate resources of the NAND-based memory device between the memory device and the host in order to maintain consistent host performance despite the variance in performance of the flash cells. It will be understood that the features of the present disclosure may be likewise applied to other classes of memory devices beside NAND-based memory devices.

The feedback control algorithm may calculate a score based on internal properties of the memory device, on other factors relating to the host, the memory device, or both, or any combination thereof. In some embodiments, a write amplification factor of the memory device, an amount of unused space on the memory device, a moving average of the bandwidth of the host over a period of time (e.g., the number of read and write operations by the host every 250 ms, for instance), other suitable factors or physical properties, or a combination thereof may be utilized to generate the score. The score indicates how the resources are allocated between the host and the memory device.

In some embodiments, a write amplification factor may be used to determine a desired bandwidth ratio between the host and the memory device, and the bandwidth of the host may be used to determine an actual bandwidth ratio between the host and the memory device. The score may be calculated by dividing the actual bandwidth ratio by the desired bandwidth ratio. In such an embodiment, a higher score may result in more of the resource being allocated to a garbage collection process of the memory device, to any other suitable process of the memory device, or any combination thereof, whereas a lower score may result in more of the resource being allocated to the host. In some embodiments, the feedback control algorithm may use one or more ranges of scores to determine how the resources are allocated. If the score is in a first range of 0.95-1.05, no adjustment of resource allocation occurs. If the score is in a second range of 0.5-1.5 (but not in the first range), an adjustment of the resource occurs. For example, a score above 1 results in more of the resource allocated to the garbage collection process. If the score is outside of the second range, a larger adjustment of the resource occurs. For example, a score above 1.5 results in more of the resource being allocated to the garbage collection process than would be allocated if the score was in the 1-1.5 range.

FIG. 1 shows an illustrative diagram of a system 100 that includes a host device 103 and NAND-based memory device 105 that functions as a storage device for the host device 103, in accordance with some embodiments of the present disclosure. As shown, the host device 103 is coupled to the solid state drive (SSD) 105 through one or more busses 113 using non-volatile memory express (NVMe) over peripheral component interconnect express (PCIe). However, it should be understood that any other suitable protocols or combinations of protocols may be used. For example, such a protocol may include serial attached small computer system interface (SAS), serial advanced technology attachment (SATA), any other suitable protocol, or any combination thereof.

The host device 103 includes a host controller 102, a memory 104, and input/output (I/O) circuitry 112. The host controller 102 may include one or more central processing units (CPUs), or other configurable controller such as one or more programmable logic arrays (PLAs), one or more field programmable gate arrays (FPGAs), one or more complex programmable logic devices (CPLDs), any other suitable controller circuitry, or any combination thereof. The memory 104 may include random access memory (RAM), read only memory (ROM), programmable ROM (PROM), firmware, flash memory, any other suitable memory, or a combination thereof. The I/O circuitry 112 may include a PCIe adapter that is communicatively coupled using NVMe over PCIe protocol over bus 113 to a host interface 124 of the NAND-based memory device 105. In some embodiments, the I/O circuitry 112 may also include adapters that are communicatively coupled with one or more client devices 101, and the host device 103 may cause information received from one or more client devices 101 to be stored in NAND-based memory device 105. As shown, the memory 104 may include a host buffer 106 and a virtual logical block address (LBA) table 108. Additionally, in some embodiments, as specified by the NVMe protocol, the memory 104 may also implement other buffers such as a submission queue (SQ) and a completion queue (CQ) for submitting and completing NVME commands (e.g., write commands, read commands, any other suitable command, or a combination thereof).

The NAND-based memory device 105 includes a controller 114, a resource 115, a non-volatile memory (NVM) 122, a host interface 124, and processing circuitry 126. The NAND-based memory device 105 includes resource 115 for performing read and write operations between host 103 and NAND-based memory device 105 and for performing necessary overhead operations within the NAND-based memory device 105 (e.g., a garbage collection process on the NAND-based memory device 105). As referred to herein, resource 115 is allocated via processing circuitry 126 between the host 103 and the overhead operations of the NAND-based memory device 105, and it will be understood that the allocation of resource 115 may be changed (e.g., as a result of a feedback control process described below). Resource 115 includes at least dies 116, central processing units (CPUs) 118, and buffers 120, although it will be understood that other suitable elements needed for performing the above operations may be included in resource 115. In some embodiments, NVM 122 may include one or more packages of dies 116. Each of the dies 116 may include a plurality of memory cells (e.g., NAND memory cells), which can each store one or more bits of information. As understood by those skilled in the art, memory cells may be organized into pages, and pages may be organized into blocks (e.g., an erasable unit). In some embodiments, buffer 120 may temporarily store information to be written to NVM 122, and CPU 118 may write information from buffer 120 to NVM 122.

In some embodiments, the NAND-based memory device 105 may be configured as an NVMe PCIe solid-state drive (SSD) that is therefore capable of being communicatively coupled to host 103 using PCIe protocol over bus 113. As described below, FIG. 2 provides an example of such a configuration of NAND-based memory device 105 as a SSD.

Figure 2:
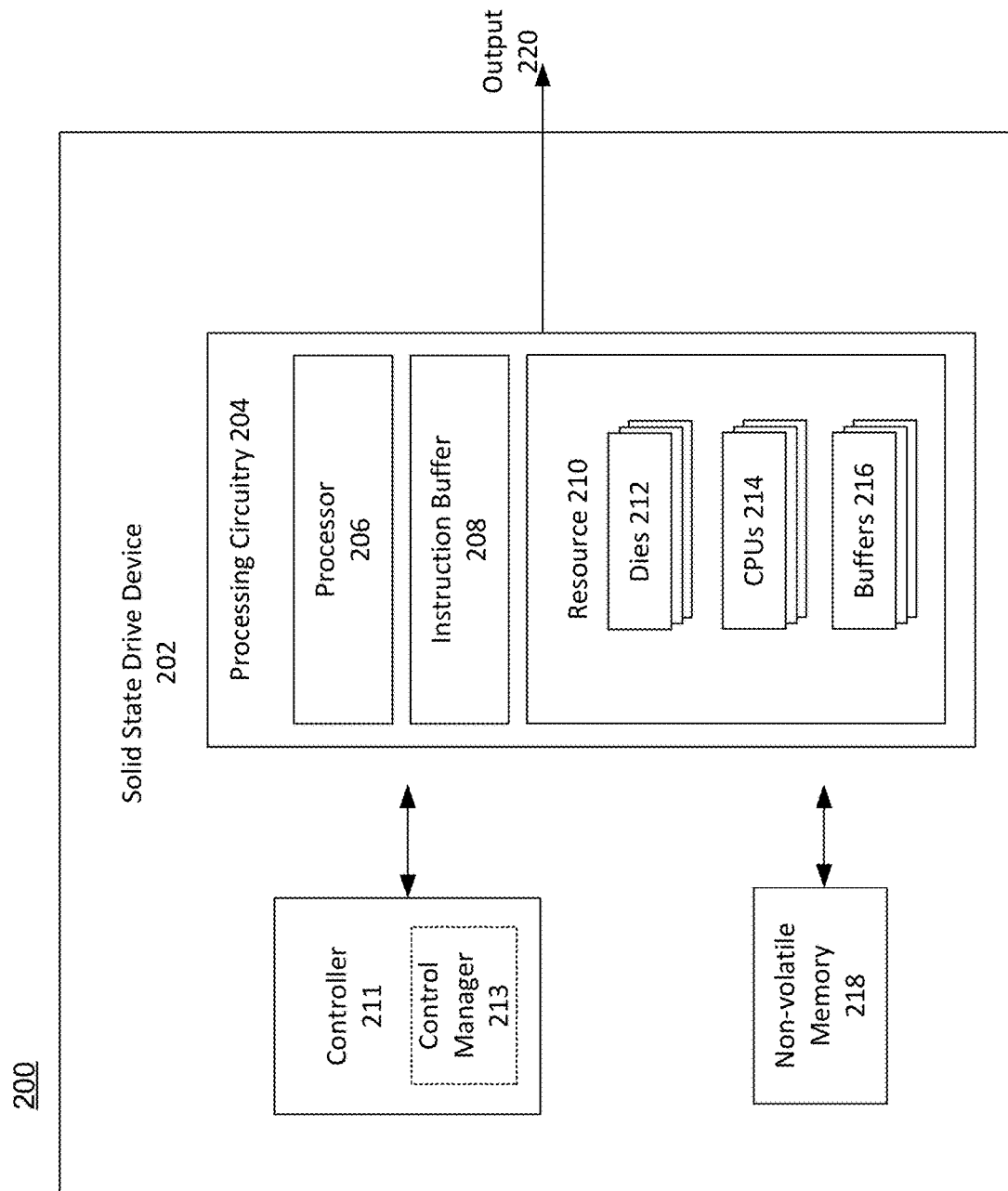
FIG. 2 shows a block diagram of an illustrative solid state drive device, in accordance with some embodiments of the present disclosure.

FIG. 2 shows a block diagram 200 of an illustrative solid state drive device 202, in accordance with some embodiments of the present disclosure. As described above, the solid state drive device 202 is a NAND-based memory device, and may be communicatively coupled to an external host using a configuration similar to FIG. 1. The exemplary solid state drive device 202 includes processing circuitry 204, controller 211, and NVM 218 (e.g., which may be the NVM 122 in FIG. 1), and has a corresponding output 220, although it will be understood that other visual and/or physical components may be included or substituted in other embodiments.

Processing circuitry 204 may be, for example, an application specific integrated circuit (ASIC), field-programmable gate array (FPGA), random access memory (RAM), read-only memory (ROM), any other suitable processing circuitry, or a combination thereof. Processing circuitry 204 includes a processor 206, instruction buffer 208, and resource 210. Resource 210 may include dies 212, CPUs 214, and buffers 216. Resource 210 may be, for example, the resource 115 in FIG. 1, and dies 212, CPUs 214, and buffers 216 may be dies 116, CPUs 118, and buffers 120, respectively. It will be understood that resource 210 is also allocated (e.g., via processor 206) between an internal overhead operation, such as a garbage collection process, and other operations, such as read and write operations from an externally coupled host. Processor 206 may reallocate the resource 210 (e.g., in response to a feedback control system output), and in some embodiments, instruction buffer 208 may be used to temporarily store allocation instructions given by processor 206 until resource 210 has finished a current operation. In some embodiments, instruction buffer 208 may be used to store instructions received from controller 211, as described below.

The controller 211 includes a control manager 213 that links with the processing circuitry 204 and that is configured to send control signals to the processing circuitry 204. In some embodiments, the processing circuitry 204 may execute a process that utilizes multi-factor feedback control to allocate memory resources. In some embodiments, the controller 211 may provide a time period to processing circuitry 204, where the time period indicates the time between each iteration of the feedback control loop. In some embodiments, a host (e.g., such as host 103 in FIG. 1) may be communicatively coupled to solid state drive device 202, and controller 211 may be connected to a host interface (e.g., such as host interface 124) that receives read and write operation requests from the host and provides instruction management accordingly to the processing circuitry 204.

Figure 3:
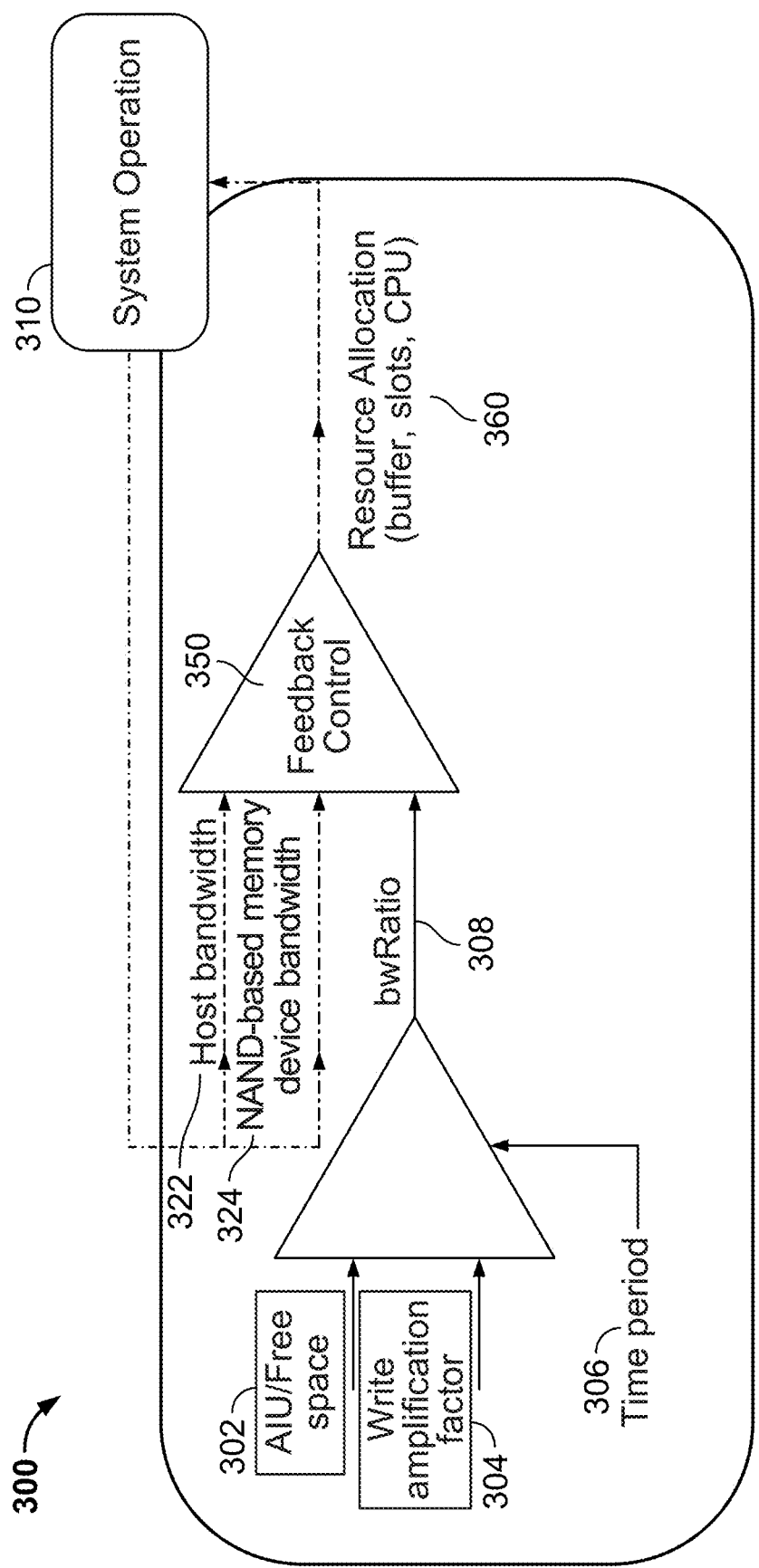
FIG. 3 shows an illustrative diagram of a data flow using feedback control in order to allocate resources of a NAND-based memory device, in accordance with some embodiments of the present disclosure.

FIG. 3 shows an illustrative diagram 300 of a data flow using feedback control 350 in order to allocate resources of a NAND-based memory device, in accordance with some embodiments of the present disclosure. The resources may be allocated (e.g., in resource allocation 360) between a garbage collection process of the NAND-based memory device and a communicatively coupled host. The NAND-based memory device may, for example, be the solid state drive device 202 in FIG. 2, and may be connected to host device 103 in FIG. 1. In another suitable example, the NAND-based memory device may be the NAND-based memory device 105 in FIG. 1. The coupling between the host and the NAND-based memory device may be the coupling process as described in FIG. 1. The data flow depicted in diagram 300 may be executed, for example, by the processing circuitry 204 in FIG. 2. Although FIG. 3 is described in the context of the particular structures, components, and processing of the present disclosure, and although a particular data flow is depicted in FIG. 3, it will be understood that in some embodiments, one or more of the steps may be modified, moved, removed, or added, and that the data flow depicted in FIG. 3 may be modified.

Execution of the data flow in diagram 300 begins by determining a free space 302, a write amplification factor 304, and a time period 306. The free space 302 (i.e., also referred to herein as available indirection units, AIU, or an amount of unused space) of a NAND-based memory device represents an amount of available storage on the memory device. Operations between the host and the memory device, such as read and write operations from the host, may reduce the free space of the memory device, and an internal garbage collection process by the memory device may increase the free space. It will be understood that decreasing the free space 302 (e.g., such that the memory device approaches logical capacity) may result in reduced performance of the memory device, physical damage to the memory device, or a combination thereof. However, increasing the free space 302 also necessarily results in reduced performance of the memory device. In some embodiments, therefore, an optimal free space may be established where performance (e.g., which may be measured by calculating the input/output operations per second (IOPs)) of the NAND-based memory device is maximized while also providing sufficient free space margin to prevent device failure. If free space 302 is higher than the optimal free space, more of the resource (e.g., buffers, dies, or CPUs) may be allocated to the host, resulting in more read/write operations to the memory device. If free space 302 is lower than the optimal free space, more of the resource may be allocated to the garbage collection process of the NAND-based memory device. In some embodiments, the desired bandwidth ratio may be biased based on the amount of free space relative to the optimal free space.

The write amplification factor 304 of the memory device represents a ratio of data written to a storage in the memory device to data written by a host to the memory device. For example, a write amplification factor of 4 indicates that for every unit of data written to the memory device by the host, 4 units of data are written in the memory device.

The time period 306 indicates a time between each iteration of the data flow depicted in diagram 300. For example, as shown, at each time period 306, the free space 302 is updated, which necessarily results in a new iteration of the feedback control process 350. However, it will be understood that other processes may also be calculated or determined at time period 306. In some embodiments, for example, between time period 306 and a previous time period, a number of write operations sent by the host to the NAND-based memory device may also be calculated. It will be understood that time period 306 may be adjusted; for example, if time period 306 is 250 ms, feedback control process 350 may be coarse, and decreasing time period 306 to 10 ms instead may result in the feedback control process 350 being more refined at the cost of more required computations.

A desired bandwidth ratio 308 is then calculated based on the free space 302 and the write amplification factor 304, although it will be understood that in other suitable embodiments, the desired bandwidth ratio 308 may be based on more or fewer factors or processes. For example, desired bandwidth ratio 308 may be based solely on either the free space 302 or the write amplification factor 304. It will be further understood that, when the free space 302 is updated at every time period 306, the desired bandwidth 308 is necessarily recalculated based on the newly determined free space 302.

The data flow in diagram 300 includes system operation 310, which describes the operations of the NAND-based memory device. In some embodiments, system operation 310 includes, at each time period 306, at least one or more write operations sent by the host to the memory device, one or more operations performed by the garbage collection process of the NAND-based memory device, or a combination thereof.

Continuing in the data flow of diagram 300, a host bandwidth 322 is determined by calculating a moving average of write operations sent by the host to the NAND-based memory device. In some embodiments, the host bandwidth 322 may be the moving average of write operations, which may be determined by calculating a total number of write operations sent by the host to the memory device (e.g., such as during system operation 310) over time period 306. In some embodiments, host bandwidth 322 may be calculated by further dividing the moving average by time period 306 (to get units of operations per time), or by applying any known technique for calculating a bandwidth. At each time period 306, the number of write operations sent by the host to the memory device is necessarily recalculated, and the host bandwidth 322 is correspondingly redetermined.

NAND-based memory device bandwidth 324 is determined similarly to the host bandwidth 322. However, instead of the total number of write operations of the host, the total number of operations performed by the garbage collection process of the NAND-based memory device is divided by time period 306 instead.

The desired bandwidth ratio 308, the host bandwidth 322, and the NAND-based memory device bandwidth 324 are then used in feedback control 350 to determine resource allocation 360. At feedback control 350, actual bandwidth ratio is calculated based on the host bandwidth 322 and the NAND-based memory device bandwidth 324. An arbitration score is then calculated based on the desired bandwidth ratio 308 and the actual bandwidth ratio. In some embodiments, the arbitration score may be the actual bandwidth ratio divided by the desired bandwidth ratio 308.

In some embodiments, feedback control 350 may have or utilize different input factors, different outputs, different calculations, or a combination thereof. For example, feedback control 350 may use a score that is based off only the write amplification factor 304 and the host bandwidth 322. In some embodiments, feedback control 350 need not include determining a score, resource allocation 360 may be determined based solely off of the free space 302. In some embodiments, the write amplification factor and the bandwidth of the host may be further weighted, and the arbitration score may be based on the weighted write amplification factor and the weighted bandwidth of the host. The total sum of the weights may equal 1, and the weights may be adjusted based on the free space 302 (e.g., at each iteration of feedback control 350).

The outcome of the data flow in diagram 300 is resource allocation 360, which allocates resources of the NAND-based memory device between the host and the garbage collection process of the memory device. In some embodiments, the resource allocation 360 may be proportional to the arbitration score calculated in feedback control 350. For example, if the score is calculated by dividing the actual bandwidth ratio by the desired bandwidth ratio 308, then increasing the score results in more of the resource being allocated to the garbage collection process, and decreasing the score results in more of the resource being allocated to the host. In some embodiments, a range of scores may be utilized to determine the allocation of the resource. For example, if the score is calculated by dividing the actual bandwidth ratio by the desired bandwidth ratio 308, if the score is between a first range of 0.95-1.05, then no reallocation of the resource occurs. If the score is in a second range of 0.5-1.5 (but not in the first range), then a reallocation of the resource occurs, where a score above 1 results in more of the resource being allocated to the garbage collection process of the memory device. If the score is outside of the second range, then a more major allocation of the resource occurs. For example, a score above 1.5 results in more of the resource allocated to the garbage collection process of the memory device than is allocated for a score between 1-1.5.

Figure 4:
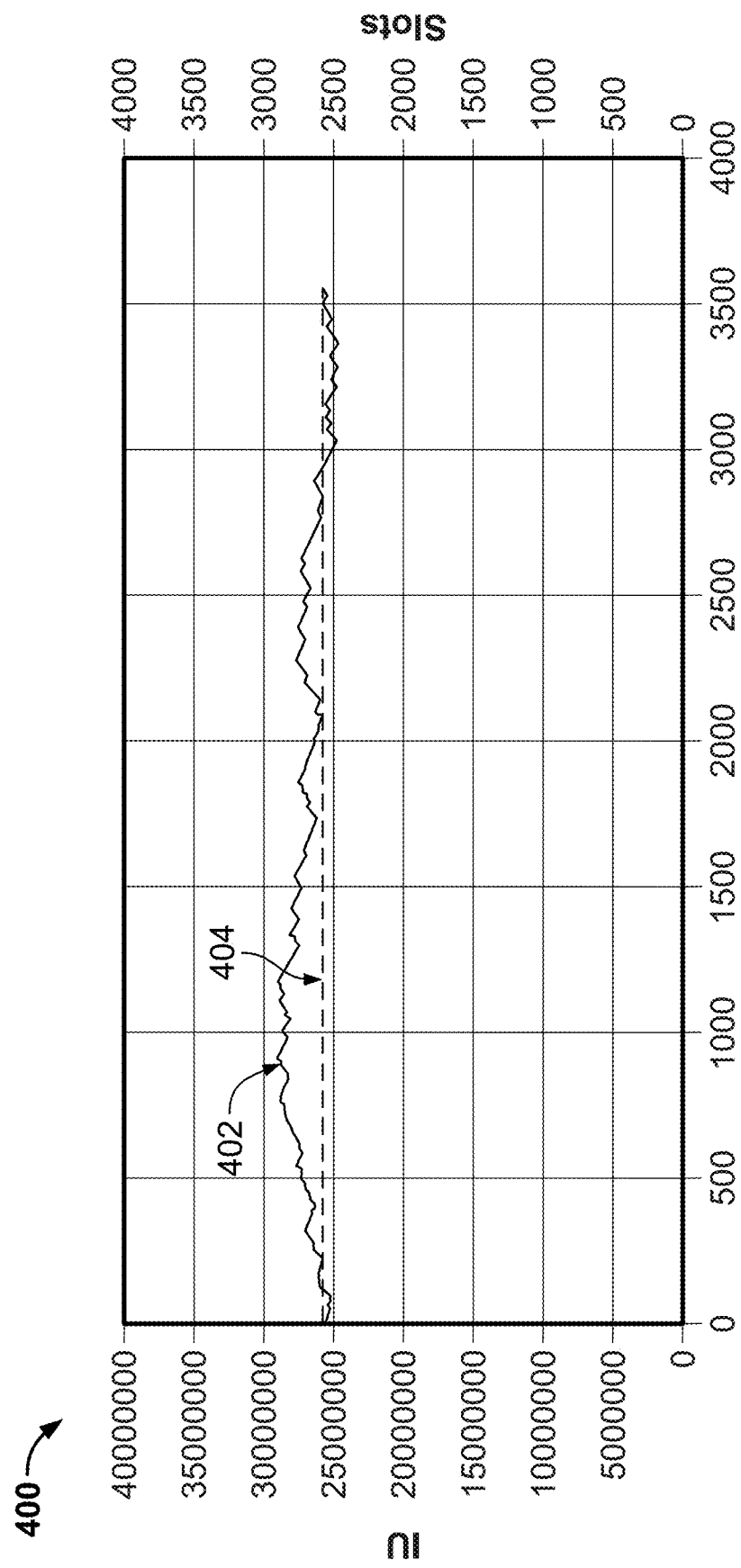
FIG. 4 shows an illustrative graph of a function of a free space over a period of time of a NAND-based memory device without feedback control to reallocate resources, in accordance with some embodiments of the present disclosure.

FIG. 4 shows an illustrative graph 400 of a function 402 of a free space of a NAND-based memory device over a time period without a feedback control process to reallocate resources of the memory device, in accordance with some embodiments of the present disclosure. In particular, the exemplary graph 400 includes function 402 of the free space over time and includes optimal free space 404, and depicts an illustrative comparison of the free space represented by function 402 to the optimal free space 404 in a NAND-based memory device without a feedback control process. It will be understood that the free space represented by function 402 may be, for example, the free space 302 described in FIG. 3.

Graph 400 includes a horizontal axis representing time and a vertical axis corresponding to the free space of the memory device (i.e., where the free space is represented by the number of AIU). As shown, function 402 depicts how the free space of the memory device changes over time. Because increasing the free space results in decreased performance, and decreasing the free space results in potential physical damage to the memory device and also in decreased performance, the NAND-based memory device has an optimal free space 404 that represents the AIU required to maximize the performance of the memory device (e.g., as determined by the IOPs, described above in FIG. 3).

Figure 5:
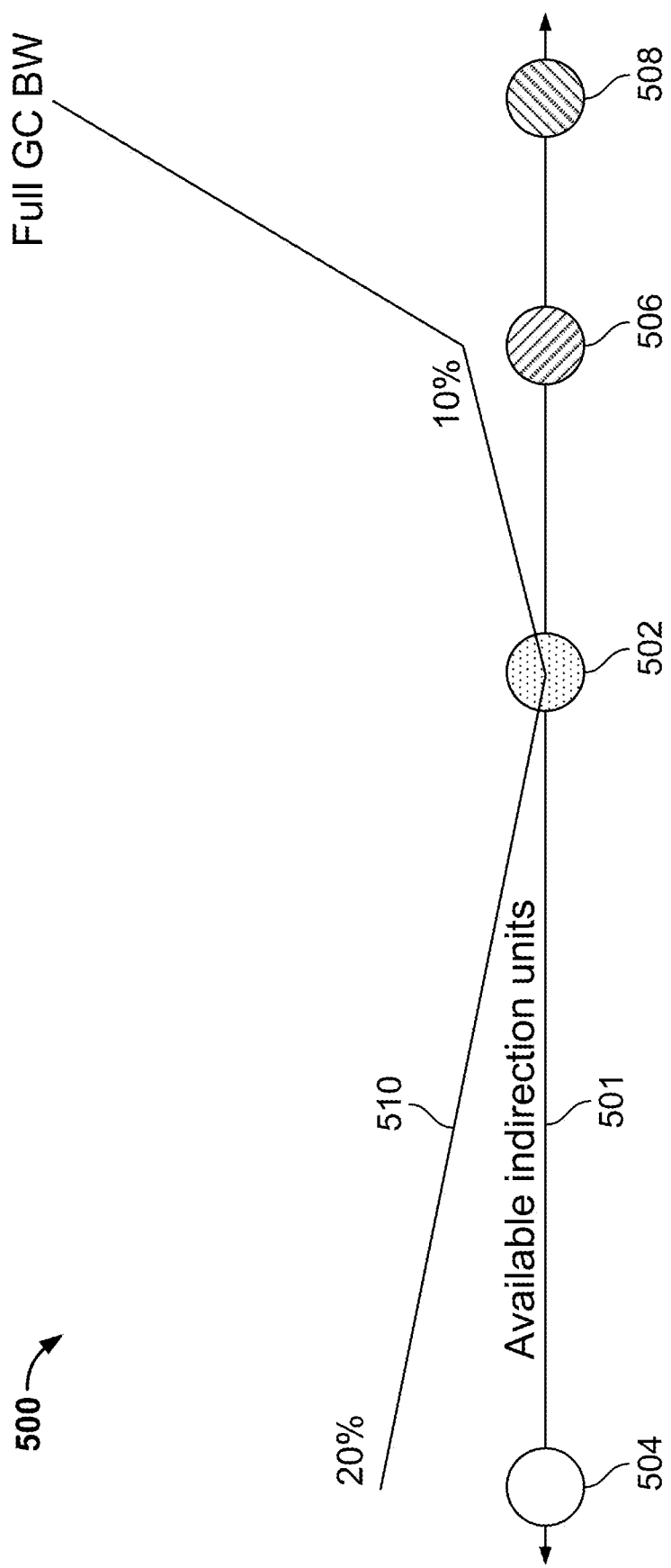
FIG. 5 shows a line graph that represents a free space of a NAND-based memory device and a corresponding bias, in accordance with some embodiments of the present disclosure.

FIG. 5 shows a line graph 500 that represents a free space of a NAND-based memory device and a corresponding bias 510, in accordance with some embodiments of the present disclosure. In particular, FIG. 5 depicts how the bias 510 changes as the free space changes (e.g., moving left and right on axis 501) in a system that utilizes feedback control to allocate resources of the NAND-based memory device (e.g., the data flow described in FIG. 3). The exemplary line graph 500 includes an axis 501, an optimal free space 502, an increased free space 504, an urgently decreased free space 506, and a critically decreased free space 508.

Line graph 500 has an axis 501 that represents the AIU (e.g., the free space) in the NAND-based memory device. It will be understood that the free space in the NAND-based memory device may be, for example, the free space 302 as described in FIG. 3. It will be further understood that moving left on the axis results in an increase in the free space, and that moving right results in a decrease in the free space. Moreover, optimal free space 502 corresponds to the optimal free space 402 as described in FIG. 4. Therefore, the increased free space 504 indicates that the free space is higher than the optimal amount, and urgently decreased free space 506 and critically decreased free space 508 indicate that the free space is lower than the optimal amount.

Bias 510 represents an absolute value of the percentage of the resource allocated to a host subtracted by the percentage of the resource for a garbage collection process of the NAND-based memory device. For example, at increased free space 504, bias 510 may be 20%, and at urgently decreased free space 506, the bias 510 may be 10%. However, as described in FIG. 3, increasing the free space results in more of the resource being allocated to the host. Therefore, it will be understood that at increased free space 504, the bias 510 at 20% represents an additional 20% of the resource being allocated to the host compared to the resource allocated to the garbage collection process. At urgently decreased free space 506, the bias 510 at 10% represents an additional 10% of the resource being allocated to the garbage collection compared to the resource allocated to the host. At critically decreased free space 508, the bias 510 is 100%, indicating that all of the resource is allocated to the garbage collection process.

It will be understood that bias 510 is not necessarily linearly proportional to the free space. For example, if an output of the feedback control process depends on calculating an arbitration score and then determining a range that the score is in, bias 510 will not be a linear process.

In some embodiments, critically decreased free space 508 may represent the logical capacity, physical capacity, or both of the NAND-based memory device (e.g., performing additional write operations onto the memory device may result in physical damage). Therefore, in order to prevent the free space from decreasing past critically decreased free space 508, at urgently decreased free space 506, the rate of change of bias 510 may increase. For example, as free space decreases from optimal free space 502, bias 510 may change at a first rate. As free space decreases below urgently free space 506, bias 510 may change at a second rate, where the second rate is higher than the first rate.

Figure 6:
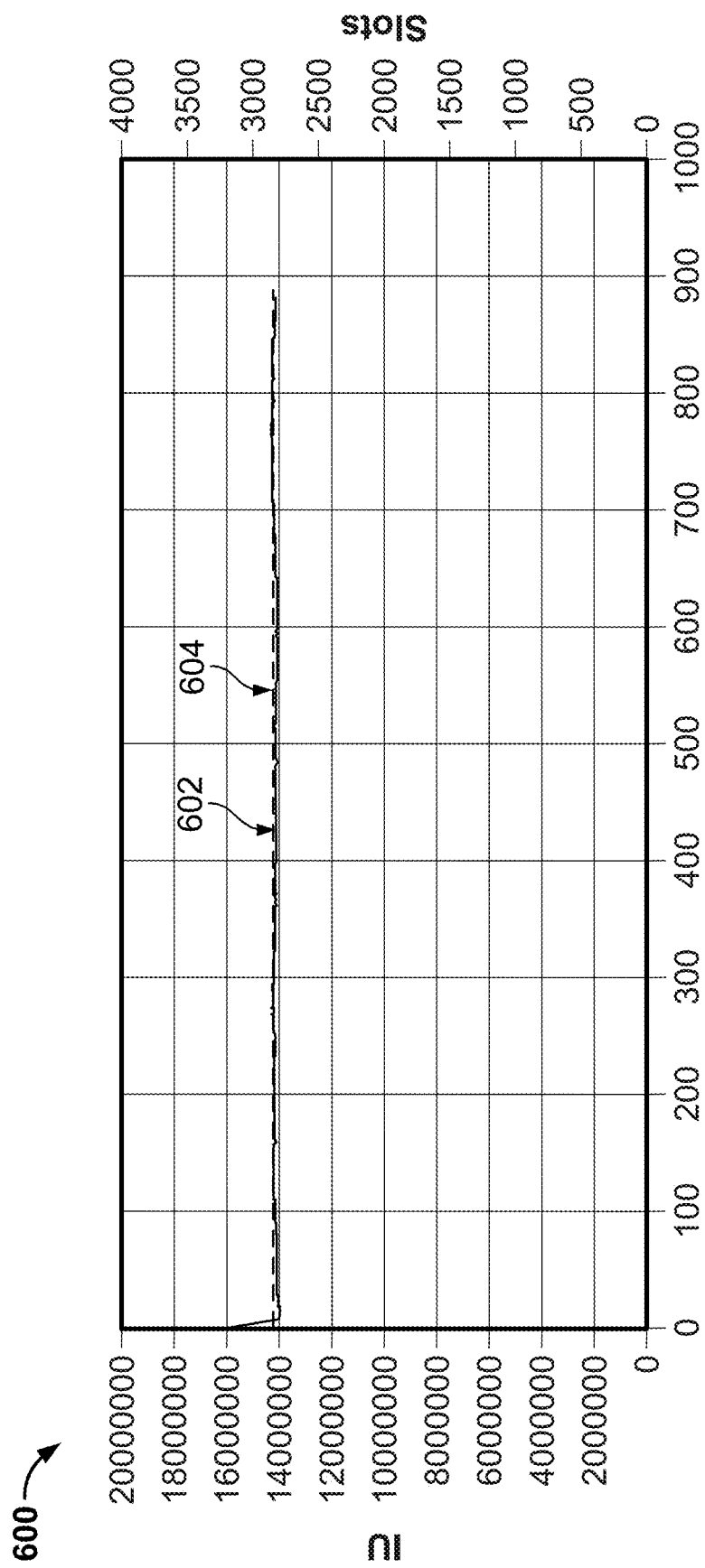
FIG. 6 shows an illustrative graph of a function of a free space over a period of time of a NAND-based memory device with feedback control to reallocate resources, in accordance with some embodiments of the present disclosure.

FIG. 6 shows an illustrative graph 600 of a function 602 of a free space of a NAND-based memory device over a time period with a feedback control process to reallocate resources of the memory device, in accordance with some embodiments of the present disclosure. In particular, the exemplary graph 600 includes function 602 of the free space over time and includes optimal free space 604 (e.g., such that function 602 and optimal free space 604 may have designs and functions corresponding to those of function 402 and optimal free space 404 in FIG. 4, respectively), and depicts an illustrative comparison of the free space represented by function 602 to the optimal free space 604 in a NAND-based memory device with a feedback control process. It will be understood that the free space represented by function 602 may be, for example, the free space 302 described in FIG. 3.

As shown, at most times (where the time is represented by the horizontal axis of graph 600 and graph 400), an absolute distance from the function 602 to the optimal free space 604 is smaller than an absolute distance from the function 402 to the optimal free space 404 at the corresponding time. In some embodiments, at the optimal free space 604, the feedback control process allocates the resource between the host and the garbage collection process of the NAND-based memory device equally. As the free space decreases (e.g., below the optimal free space 604), the feedback control process allocates more of the resource to a garbage collection process, resulting in an increase of free space. As the free increases (e.g., above the optimal free space 604), the feedback control process allocates more of the resource to the read/write operations of the host, resulting in a decrease of free space.

Figure 7:
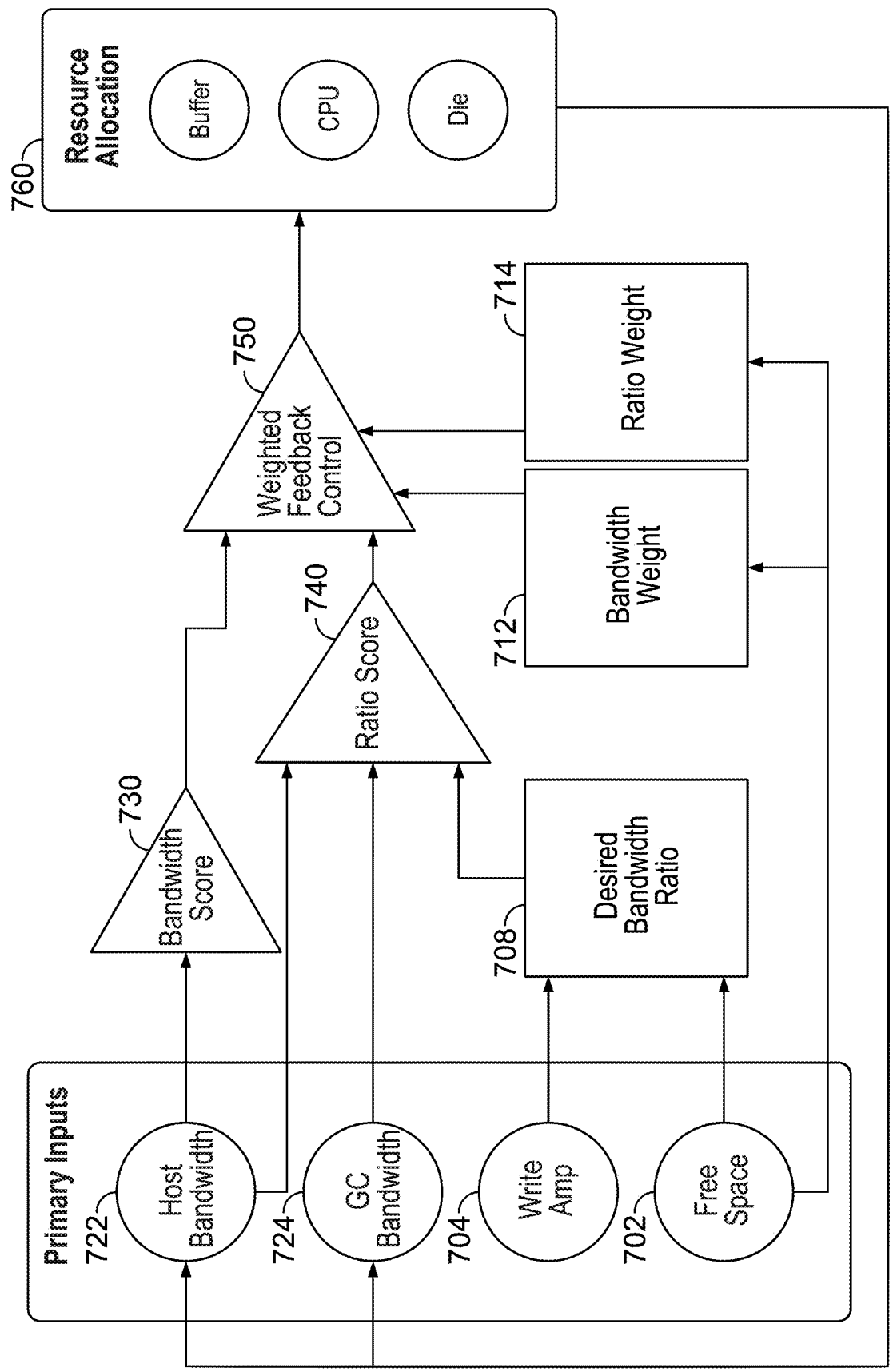
FIG. 7 shows an illustrative diagram of a data flow using weighted feedback control 750 in order to allocate resources of a NAND-based memory device, in accordance with some embodiments of the present disclosure.

FIG. 7 shows an illustrative diagram 700 of a data flow using weighted feedback control 750 in order to allocate resources of a NAND-based memory device, in accordance with some embodiments of the present disclosure. The resources may be allocated (e.g., in resource allocation 760) between a garbage collection process of the NAND-based memory device and a communicatively coupled host. The NAND-based memory device may, for example, be the solid state drive device 202 in FIG. 2, and may be connected to host device 103 in FIG. 1. In another suitable example, the NAND-based memory device may be the NAND-based memory device 105 in FIG. 1. The coupling between the host and the NAND-based memory device may be the coupling process as described in FIG. 1. The data flow depicted in diagram 700 may be executed, for example, by the processing circuitry 204 in FIG. 2. Although FIG. 7 is described in the context of the particular structures, components, and processing of the present disclosure, and although a particular data flow is depicted in FIG. 7, it will be understood that in some embodiments, one or more of the steps may be modified, moved, removed, or added, and that the data flow depicted in FIG. 7 may be modified.

Execution of the data flow in diagram 700 begins by determining a free space 702 and a write amplification factor 704. The free space 702 may be, for example, the free space 302 in FIG. 3, and the write amplification factor 704 may be the write amplification factor 304. The desired bandwidth ratio 708 (e.g., which may be the desired bandwidth ratio 308 in FIG. 3) may be calculated based on the free space 702 and the write amplification factor 704, although it will be understood that desired bandwidth ratio 708 may be based on more or fewer factors or processes.

The free space 702 may also be utilized to determine bandwidth weight 712 and ratio weight 714. In some embodiments, bandwidth weight 712 may be a number between 0 and 1, and ratio weight 714 may be the result of the bandwidth weight 712 subtracted from 1. In some embodiments, as the free space 702 approaches a target, optimal free space (e.g., the optimal free space 402 in FIG. 4), the bandwidth weight 712 may be increased, and the ratio weight 714 may be correspondingly decreased.

The data flow in diagram 700 also includes host bandwidth 722 and garbage collection bandwidth 724 (e.g., of the NAND-based memory device), where the host bandwidth 722 may be the host bandwidth 322 in FIG. 3 and the garbage collection bandwidth 724 may be the NAND-based memory bandwidth 324 in FIG. 3. As in FIG. 3, the host bandwidth 722 and the garbage collection bandwidth 724 may be determined based on a system operation that is occurring in tandem with the feedback control dataflow (e.g., such as the system operation 310 in FIG. 3). The host bandwidth 722 may be averaged over a period of time (e.g., time period 306 in FIG. 3) in order to determine a moving average host bandwidth, and the measured host bandwidth 722 may be subsequently divided by the determined moving average host bandwidth in order to calculate the bandwidth score 730. The bandwidth score 730 may therefore measure, for example, how close the measured host bandwidth 722 matches to the moving average host bandwidth. For example, a bandwidth score 730 equal to 1 may represent that the host bandwidth matches with the moving average host bandwidth, and may indicate that the host IOPs are consistent.

The host bandwidth 722, garbage collection bandwidth 724, and the desired bandwidth ratio 708 are then utilized to determine a ratio score 740. In some embodiments, an actual bandwidth ratio may be calculated based on the host bandwidth 722 and the garbage collection bandwidth 724. The actual bandwidth ratio may then be divided by the desired bandwidth ratio 708 to calculate the ratio score 740. The ratio score 740 may measure how closely the actual bandwidth ratio matches the desired bandwidth ratio 708. For example, a ratio score 740 equal to 1 may represent that the actual bandwidth ratio matches the desired bandwidth ratio 708, and may indicate that the free space 702 is consistent.

The bandwidth score 730, ratio score 740, bandwidth weight 712, and ratio weight 714 are then used as inputs in weighted feedback control 750, although it will be understood that weighted feedback control 750 may have more or fewer suitable inputs. At weighted feedback control 750, an arbitration score may be calculated as a weighted average based on the input elements. In some embodiments, the bandwidth score 730 may be multiplied by the bandwidth weight 712, the ratio score may be multiplied by the ratio weight 714, and the two resulting values may be added to determine the arbitration score.

The outcome of dataflow 700 is resource allocation 760, which allocates resources of the NAND-based memory device between the host and the garbage collection process of the memory device. In some embodiments, the resource allocation 760 may be proportional to the arbitration score calculated in feedback control 750. In some embodiments, increasing the score results in more of the resource being allocated to the garbage collection process, and decreasing the score results in more of the resource being allocated to the host. In some embodiments, a range of scores may be utilized to determine the allocation of the resource. For example, if the score is between a first range of 0.95-1.05, then no reallocation of the resource occurs. If the score is in a second range of 0.5-1.5 (but not in the first range), then a reallocation of the resource occurs, where a score above 1 results in more of the resource being allocated to the garbage collection process of the memory device. If the score is outside of the second range, then a more major allocation of the resource occurs. For example, a score above 1.5 results in more of the resource allocated to the garbage collection process of the memory device than is allocated for a score between 1-1.5. Based on the resource allocation 760, the corresponding system operations in the NAND-based memory device are then used to determine the host bandwidth 722 and garbage collection bandwidth 724 to be used in the next iteration of dataflow 700.

Figure 8:
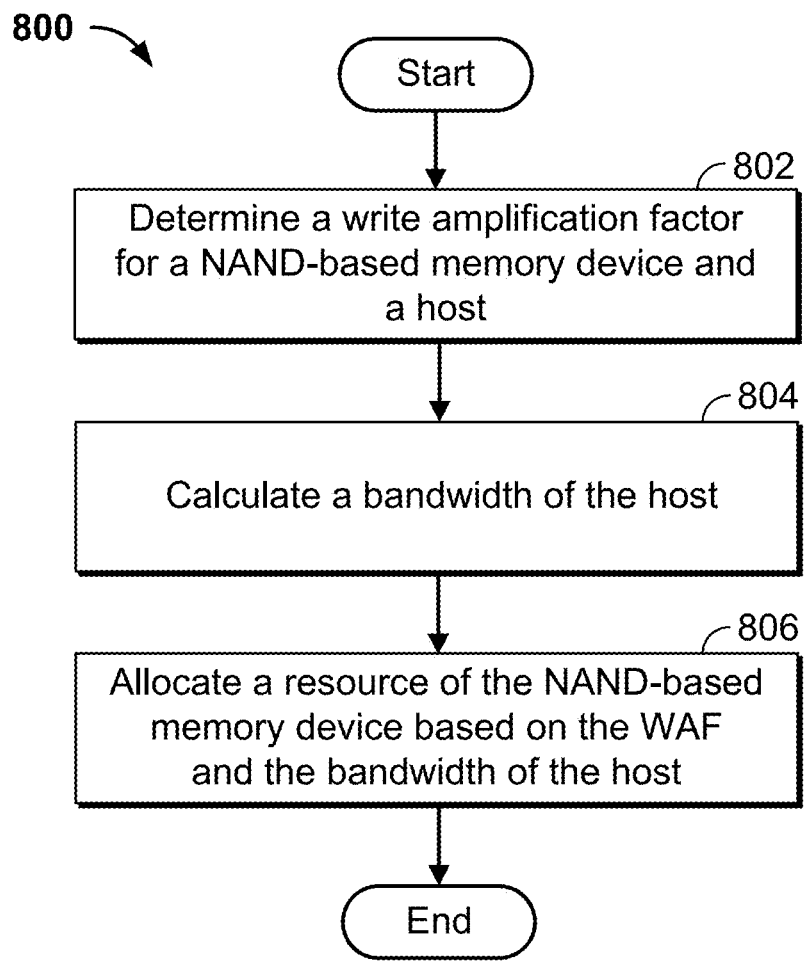
FIG. 8 shows a flowchart of illustrative steps for utilizing feedback control to allocate resources of a particular NAND-based memory device, in accordance with some embodiments of the present disclosure.

FIG. 8 shows a flowchart of illustrative steps for utilizing feedback control to allocate resources of a particular NAND-based memory device, in accordance with some embodiments of the present disclosure. The steps of the flowchart 800 depicted in FIG. 8 may be executed, for example, by the processing circuitry 204 in FIG. 2. Although FIG. 8 is described in the context of the particular structures, components, and processing of the present disclosure, and although a particular order and flow of steps are depicted in FIG. 8, it will be understood that in some embodiments, one or more of the steps may be modified, moved, removed, or added, and that the order of steps depicted in FIG. 8 may be modified.

Exemplary steps for allocating resources of a NAND-based memory device begins at step 802, where a write amplification factor is determined for a NAND-based memory device and a host coupled to the memory device. The write amplification factor represents a ratio of data written to a storage in the memory device to data written by a host to the memory device. For example, a write amplification factor of 4 indicates that for every unit of data written to the memory device by the host, 4 units of data in the memory device are used to store the unit of data written by the host. Processing may then continue to step 804.

At step 804, a bandwidth of the host is calculated. The bandwidth of the host may be calculated using any known technique for calculating a bandwidth, and may be based off a number of write operations from the host to the memory device over a period of time. In some embodiments, the number of write operations from the host to the memory device may be determined every time period, and the bandwidth of the host is also correspondingly recalculated at every time period. Processing may then continue to step 806.

At step 806, resources of the NAND-based memory device are allocated based on the write amplification factor and the bandwidth of the host. The resource may be at least one of a die, CPU, or a buffer, and the resource is allocated at least between the host and a garbage collection process of the NAND-based memory device.

It will be understood that FIG. 8 shows exemplary steps for a single iteration of the feedback control process to allocate resources of the NAND-based memory device. However, it will be understood that allocating the resource may directly result in a change to the write amplification factor, bandwidth of the host, other related factors, or a combination thereof. Therefore, the steps in FIG. 8 may be repeated in order to create a feedback control loop, where after allocating the resource, the write amplification factor and bandwidth of the host is recalculated, and the resource is further reallocated based on the newly determined write amplification factor and host bandwidth.

Figure 9:
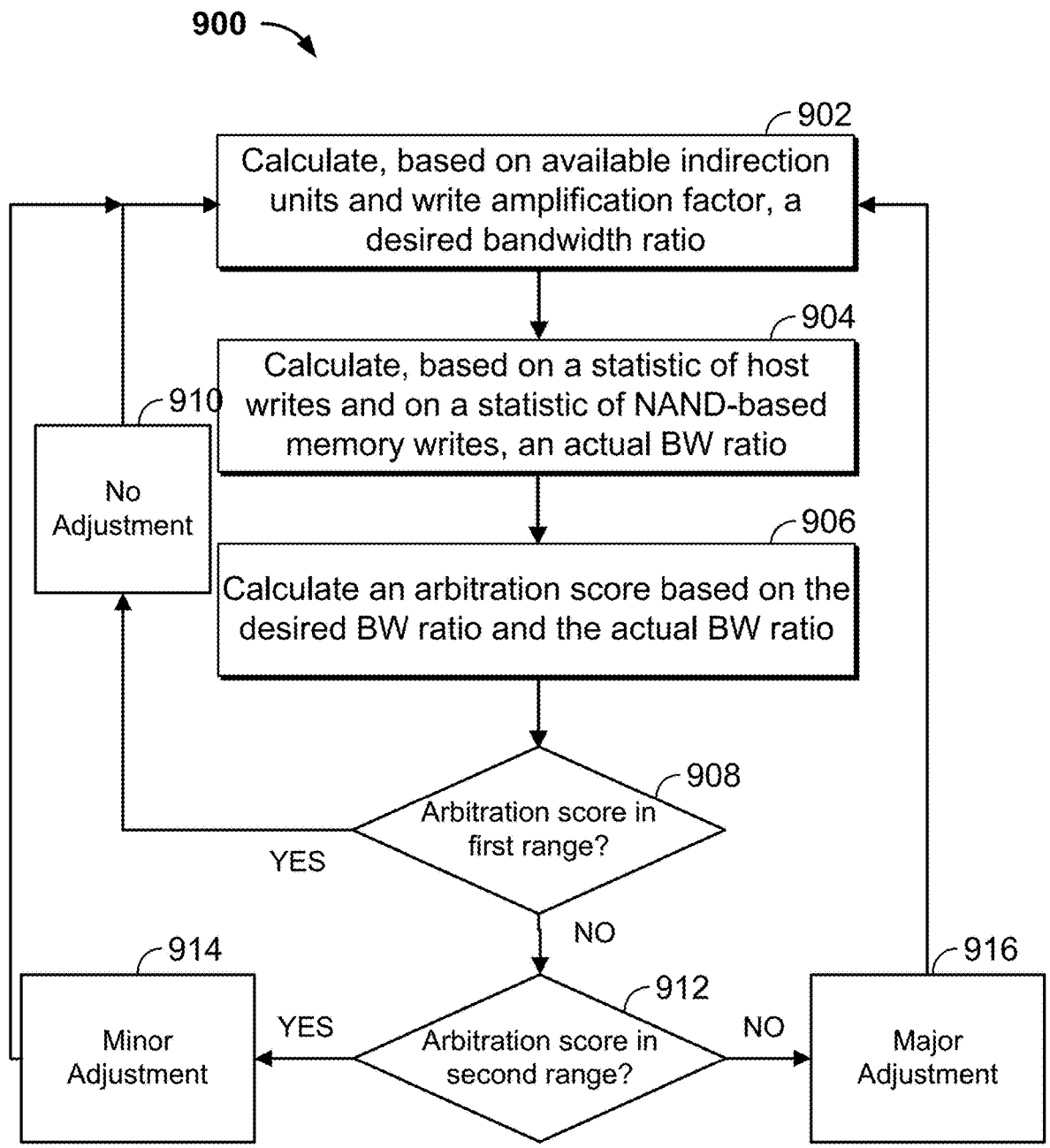
FIG. 9 shows a flowchart of illustrative steps for allocating resources of a NAND-based memory device in accordance with some embodiments of the present disclosure.

FIG. 9 shows a flowchart 900 of illustrative steps of how resources of a NAND-based memory device are allocated in a specific embodiment. As in FIG. 7, the steps of flowchart 900 as depicted in FIG. 9 may be executed by processing circuitry 204 in FIG. 2. Furthermore, although a particular order and flow of steps are depicted in FIG. 9, it will be understood that in some other embodiments, one or more of the steps may be modified, moved, removed, or added, and that the order of steps depicted in FIG. 9 may be modified.

Exemplary steps for determining how the resource of the memory device is allocated begins at step 902, where a desired bandwidth ratio is calculated based on a free space (i.e., a number of available indirection units) and a write amplification factor. It will be understood, however, that the desired bandwidth ratio may be calculated based on different factors in other embodiments. For example, the desired bandwidth ratio may be calculated solely based on the write amplification factor. Processing may then continue to step 904.

At step 904, an actual bandwidth ratio is calculated based on a statistic of host writes to the NAND-based memory device and on a statistic of NAND-based memory writes. For example, the statistic may be a moving average of writes over a period of time. In another suitable example, any known technique may be further applied to the moving averages to determine a bandwidth of the host and a bandwidth of the NAND-based memory device. The actual bandwidth ratio may be determined, for example, by dividing the bandwidth of the host by the bandwidth of the NAND-based memory device, although it will be understood that other suitable processes may be used to determine the actual bandwidth ratio. Once the actual bandwidth ratio is calculated, processing may then continue to step 906.

At step 906, an arbitration score is calculated based on the desired bandwidth ratio and the actual bandwidth ratio. For example, the actual bandwidth ratio may be divided by the desired bandwidth ratio. It will be understood, however, that in different processes other factors may be used and/or substituted to calculate the score in other embodiments. For example, the score may be calculated based off only the write amplification factor and the bandwidth of the host. In some embodiments, the write amplification factor and the bandwidth of the host may be further weighted, and the arbitration score may be based on the weighted write amplification factor and the weighted bandwidth of the host. The total sum of the weights may equal 1, and the weights may be adjusted based on the free space.

Processing then continues to step 908, where the arbitration score determined in step 906 is compared to a first range. For example, if the score is the actual bandwidth ratio divided by the desired bandwidth ratio, then a suitable first range may be 0.95-1.05. If the score is within the first range ("YES" to step 908), processing continues to step 910, where it is determined that no adjustment to the allocation of the resource occurs, and processing loops back to step 902. If the score is not within the first range ("NO" to step 908), processing may then continue to step 912.

At step 912, the arbitration score may then be compared to a second range. If the score is the actual bandwidth ratio divided by the desired bandwidth ratio, then a suitable second range may be 0.5-1.5. If the score is in the second range ("YES" to step 912), processing continues to step 914, where a minor adjustment to the allocation of the resource occurs, and then loops back to step 902. If the score is not in the second range ("NO" to step 912), processing continues to step 916, where a major adjustment to the allocation of the resource occurs, and then loops back to step 902. For example, in the specific embodiment described in FIG. 9, a score greater than 1 results in more of the resource being allocated to the garbage collection process of the NAND-based memory device, and a score less than 1 results in more of the resource being allocated to the host.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

While some portions of this disclosure may refer to examples, any such reference is merely to provide context to the instant disclosure and does not form any admission as to what constitutes the state of the art.

What is claimed is:

1. A method, comprising:
    determining, using processing circuitry, a write amplification factor for a NAND-based memory device and a host coupled to the NAND-based memory device;
    calculating, using the processing circuitry, a bandwidth of the host;
    determining a desired bandwidth ratio based on the write amplification factor;
    determining an actual bandwidth ratio based on the bandwidth of the host; and
    causing, using the processing circuitry, a resource of the NAND-based memory device to be allocated between the host and an internal garbage collection process based on the desired bandwidth ratio and on the actual bandwidth ratio.

2. The method of claim 1, wherein allocating the resource of the NAND-based memory device comprises:
    calculating a score based on the write amplification factor and on the bandwidth of the host; and
    allocating the resource of the NAND-based memory device based on the score.

3. The method of claim 2, wherein calculating the score comprises:
    calculating the score based on the actual bandwidth ratio and on the desired bandwidth ratio.

4. The method of claim 2, wherein the score is further based on a weighted average of the write amplification factor and on the bandwidth of the host.

5. The method of claim 4, wherein the write amplification factor and the bandwidth of the host are weighted based on an amount of unused free space.

6. The method of claim 1, wherein the NAND-based memory device is a solid state drive.

7. The method of claim 1, wherein calculating the bandwidth of the host comprises calculating a number of write operations sent by the host to the NAND-based memory device over a time period.

8. The method of claim 1, wherein calculating the bandwidth of the host further comprises calculating a moving average of the number of write operations.

9. The method of claim 1, wherein causing the resource of the NAND-based memory device to be allocated is further based on an amount of unused space of the NAND-based memory device.

10. The method of claim 9, wherein decreasing the amount of unused space causes more of the resource to be allocated to the internal garbage collection process of the NAND-based memory device.

11. The method of claim 1, wherein the resource is at least one of a buffer, a CPU, or a die.

12. A system comprising:
    a host;
    a NAND-based memory device;
    processing circuitry to:
        determine a write amplification factor for the NAND-based memory device and the host coupled to the NAND-based memory device;
        calculate a bandwidth of the host;
        determine a desired bandwidth ratio based on the write amplification factor;
        determine an actual bandwidth ratio based on the bandwidth of the host; and
        cause a resource of the NAND-based memory device to be allocated between the host and an internal garbage collection process based on the desired bandwidth ratio and on the actual bandwidth ratio.

13. The system of claim 12, wherein allocating the resource of the NAND-based memory device comprises:
    calculating a score based on the write amplification factor and on the bandwidth of the host; and
    allocating the resource of the NAND-based memory device based on the score.

14. The system of claim 12, wherein the NAND-based memory device is a solid state drive.

15. The system of claim 12, wherein calculating the bandwidth of the host comprises calculating a number of write operations sent by the host to the NAND-based memory device over a time period.

16. The system of claim 12, wherein calculating the bandwidth of the host further comprises calculating a moving average of the number of write operations.

17. The system of claim 12, wherein causing the resource of the NAND-based memory device to be allocated is further based on an amount of unused space of the NAND-based memory device.

18. The system of claim 17, wherein decreasing the amount of unused space causes more of the resource to be allocated to the internal garbage collection process of the NAND-based memory device.

19. The system of claim 12, wherein the resource is at least one of a buffer, a CPU, or a die.

20. A non-transitory computer readable medium storing program code that, when executed, performs a method comprising:
    determining a write amplification factor for a NAND-based memory device and a host coupled to the NAND-based memory device;
    calculating, using the processing circuitry, a bandwidth of the host;
    determining a desired bandwidth ratio based on the write amplification factor;
    determining an actual bandwidth ratio based on the bandwidth of the host; and
    causing, using the processing circuitry, a resource of the NAND-based memory device to be allocated between the host and an internal garbage collection process based on the desired bandwidth ratio and on the actual bandwidth ratio.

21. The non-transitory computer readable medium of claim 20, wherein allocating the resource of the NAND-based memory device comprises:
    calculating a score based on the write amplification factor and on the bandwidth of the host; and
    allocating the resource of the NAND-based memory device based on the score.

22. The non-transitory computer readable medium of claim 20, wherein the NAND-based memory device is a solid state drive.

23. The non-transitory computer readable medium of claim 20, wherein calculating the bandwidth of the host comprises calculating a number of write operations sent by the host to the NAND-based memory device over a time period.

24. The non-transitory computer readable medium of claim 20, wherein calculating the bandwidth of the host further comprises calculating a moving average of the number of write operations.

25. The non-transitory computer readable medium of claim 20, wherein causing the resource of the NAND-based memory device to be allocated is further based on an amount of unused space of the NAND-based memory device.

26. The non-transitory computer readable medium of claim 25, wherein decreasing the amount of unused space causes more of the resource to be allocated to the internal garbage collection process of the NAND-based memory device.

27. The non-transitory computer readable medium of claim 20, wherein the resource is at least one of a buffer, a CPU, or a die.

* * * * *